United States Patent
Miyaji et al.

(10) Patent No.: US 11,139,763 B2
(45) Date of Patent: Oct. 5, 2021

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventors: Haruka Miyaji, Toyohashi (JP); Kei Yamazaki, Ueda (JP); Takayuki Matsui, Toyohashi (JP); Kazuo Takada, Kosai (JP); Shigeki Miyaji, Hamamatsu (JP); Ayaka Shimada, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/939,473

(22) Filed: Jul. 27, 2020

(65) Prior Publication Data
US 2021/0044229 A1 Feb. 11, 2021

(30) Foreign Application Priority Data
Aug. 7, 2019 (JP) .............................. JP2019-145627

(51) Int. Cl.
*H02P 8/38* (2006.01)
*H02P 6/18* (2016.01)

(52) U.S. Cl.
CPC ....................... *H02P 8/38* (2013.01)

(58) Field of Classification Search
CPC ...... H02P 6/18; H02P 6/06; H02P 6/14; H02P 8/38; H02K 29/12; H02K 21/24; G04C 3/16; H01R 39/46
See application file for complete search history.

(56) References Cited

U.S. PATENT DOCUMENTS

| | | | | |
|---|---|---|---|---|
| 5,545,963 A | * | 8/1996 | Aizawa | H02P 8/18 318/400.13 |
| 6,262,554 B1 | * | 7/2001 | Kojima | G05B 19/39 318/445 |
| 8,278,857 B2 | * | 10/2012 | Lin | H02P 6/14 318/400.28 |
| 8,335,135 B2 | * | 12/2012 | Manaka | G04C 3/143 368/80 |
| 2012/0104985 A1 | * | 5/2012 | Yamada | H02P 8/34 318/696 |

(Continued)

FOREIGN PATENT DOCUMENTS

JP 2010-093914 A 4/2010

*Primary Examiner* — Said Bouziane
(74) *Attorney, Agent, or Firm* — Pearne & Gordon LLP

(57) ABSTRACT

A motor drive control device has a controller and a driver. The controller generates a control signal for controlling driving of a two-phase stepping motor so as to alternately repeat one-phase excitation in which a coil of one phase in coils of two phases of the two-phase stepping motor is excited and two-phase excitation in which the coils of two phases in the coils of the two phases are excited. The driver drives the coils of the two phases, based on the control signal. The controller determines, based on a back electromotive force generated in the coil that was not excited during the one-phase excitation, a period of performing the one-phase excitation, and determines, based on the period of the one-phase excitation performed before the two-phase excitation, a period of performing the two-phase excitation.

8 Claims, 5 Drawing Sheets

(56) References Cited

U.S. PATENT DOCUMENTS

2019/0190415 A1* 6/2019 Hijikata ................... H02P 6/24
2019/0372489 A1* 12/2019 Yamamoto ............. H02P 6/157
2020/0295685 A1* 9/2020 Imamiya .................. H02P 8/38

* cited by examiner

MOTOR DRIVE CONTROL DEVICE, MOTOR UNIT, AND MOTOR DRIVE CONTROL METHOD

CROSS REFERENCE TO RELATED APPLICATIONS

This application claims the benefit of Japanese Patent Application No. 2019-145627, filed Aug. 7, 2019, which is hereby incorporated by reference in its entirety.

BACKGROUND

Technical Field

The present disclosure relates to a motor drive control device, a motor unit, and a motor drive control method, and, for example, relates to a motor drive control device for driving a stepping motor.

Background

As a stepping motor, a two-phase stepping motor having two phases has been known.

As methods of driving a two-phase stepping motor, a one-phase excitation method, a two-phase excitation method, and a 1-2 phase excitation method have been known.

The one-phase excitation method is a method in which the phase to be excited is switched every single phase. The two-phase excitation method is a method in which the phases to be excited are switched every two phases. The 1-2 phase excitation method is a method in which the phases to be excited are switched by alternately switching one-phase excitation and two-phase excitation.

For example, Japanese Patent Application Laid-Open No. 2010-93914 discloses a motor drive control technique that provides, within a period of one-phase excitation, a period for exciting two phases of the same phases as the next period of two-phase excitation so as to reduce variations in the rotational speed of a two-phase stepping motor when the stepping motor is driven by the 1-2 phase excitation method.

SUMMARY

The inventors of the present application studied the use of the 1-2 phase excitation method that provides larger torque compared to torque generated by the one-phase excitation as a method of driving a two-phase stepping motor for use in a predetermined application.

However, in a general 1-2 phase excitation method represented by Japanese Patent Application Laid-Open No. 2010-93914, the lengths of each of a period in which one-phase excitation is performed and a period in which two-phase excitation is performed are fixed (uniform) in advance. Therefore, in the 1-2 phase excitation method, the tolerance to load changes is low. Specifically, when the load on the two-phase stepping motor increases, an excitation phase is switched before a rotor moves to an appropriate position, and consequently the torque decreases, and a step-out easily occurs.

The present disclosure is related to increasing the tolerance of the two-phase stepping motor to load changes.

A motor drive control device according to a representative embodiment of the present disclosure has a controller that generates a control signal for controlling driving of a two-phase stepping motor so as to alternately repeat one-phase excitation in which a coil of one phase in coils of two phases of the two-phase stepping motor is excited and two-phase excitation in which the coils of two phases in the coils of the two phases are excited; and a driver that drives the coils of the two phases, based on the control signal, wherein the controller determines, based on a back electromotive force generated in the coil that was not excited during the one-phase excitation, a period of performing the one-phase excitation, and determines, based on the period of the one-phase excitation performed before the two-phase excitation, a period of performing the two-phase excitation.

According to the motor drive control device, it is possible to increase the tolerance of the two-phase stepping motor to load changes.

DETAILED DESCRIPTION

1. Outline of Embodiments

Figure 1:
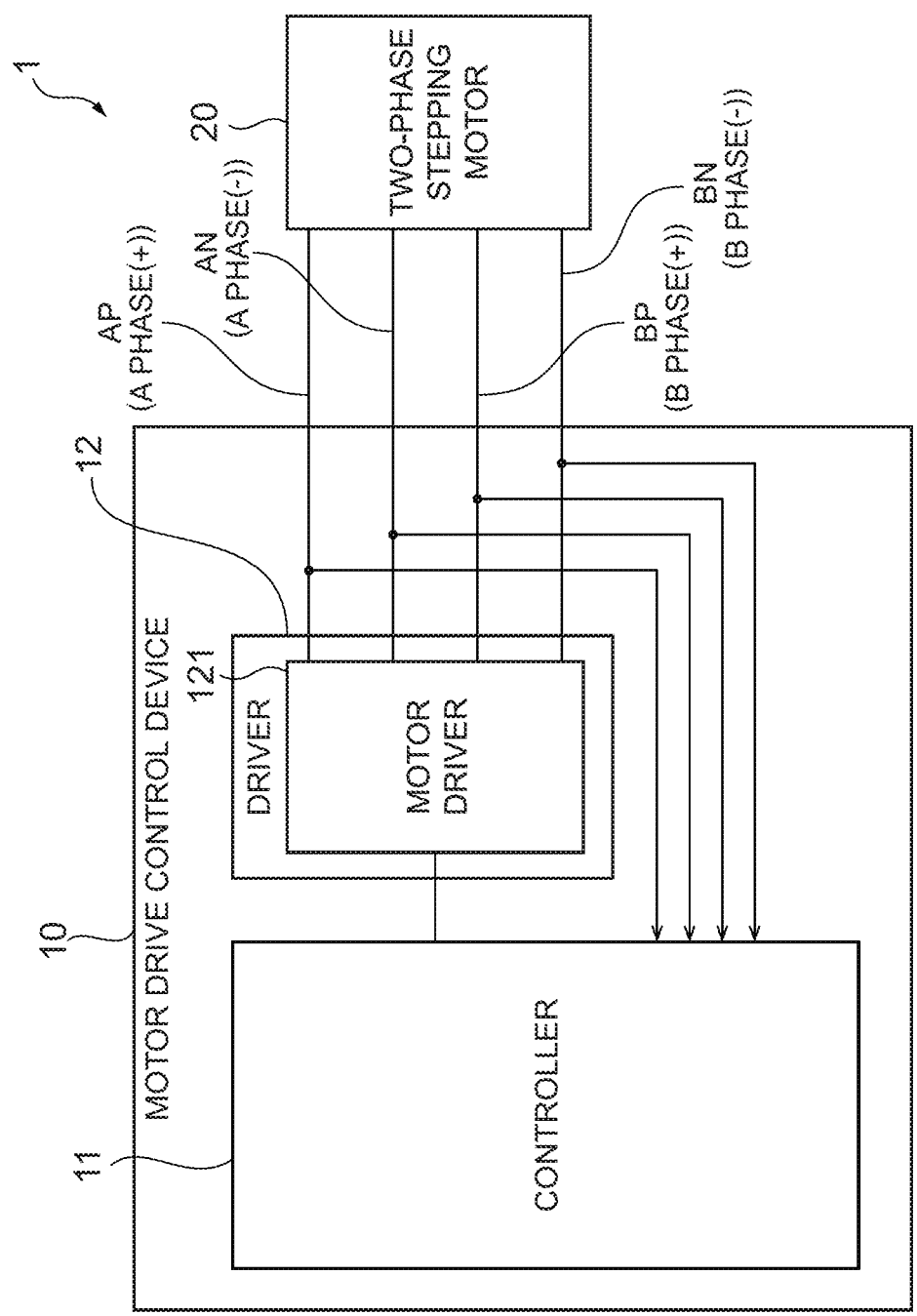
FIG. 1 is a block diagram showing the configuration of a motor unit according to an embodiment of the present disclosure.

First, an outline of representative embodiments of the disclosure disclosed in the present application will be described. In the following description, as an example, reference numerals on the drawings corresponding to components of the disclosure are shown with parentheses.

[1] A motor drive control device (10) according to a representative embodiment of the present disclosure has a controller (11) that generates a control signal (Sc) for controlling driving of a two-phase stepping motor (20) so as to alternately repeat one-phase excitation in which a coil of one phase in coils (21A, 21B) of two phases of the two-phase stepping motor is excited and two-phase excitation in which the coils of two phases in the coils of the two phases are excited; and a driver (12) that drives the coils of the two phases, based on the control signal, wherein the controller determines, based on a back electromotive force generated in the coil that was not excited during the one-phase excitation, a period (such as T1, T3, and T5) of performing the one-phase excitation, and determines, based on the period of the one-phase excitation performed before the two-phase excitation, a period (such as T2, T4, and T6) of performing the two-phase excitation.

[2] In the motor drive control device according to [1], the controller may generate the control signal so as to switch an excitation state of the two-phase stepping motor from the one-phase excitation to the two-phase excitation, according to a result of detection of a zero-crossing of the back electromotive force generated in the coil that was not excited during the period of the one-phase excitation. Further, after the start of the two-phase excitation, when a target energization time determined according to the period of the one-phase excitation performed before the two-phase excitation has elapsed, the controller may generate the control signal so as to switch the excitation state of the two-phase stepping motor from the two-phase excitation to the one-phase excitation.

[3] In the motor drive control device according to [2], the controller may set the target energization time such that the period of the two-phase excitation is equal to the period of the one-phase excitation performed immediately before the two-phase excitation.

[4] In the motor drive control device according to [2], the controller may set the target energization time for the period of the two-phase excitation, based on a value calculated from a plurality of periods of the one-phase excitation performed before the two-phase excitation.

[5] In the motor drive control device according to any one of [2] to [4], the controller may generate the control signal so as to switch the excitation state of the two-phase stepping motor from the one-phase excitation to the two-phase excitation when the zero-crossing of the back electromotive force generated in the coil that was not excited was detected twice during the period of the one-phase excitation.

[6] In the motor drive control device according to any one of [2] to [5], the controller (11) includes: a clocking unit (114) that measures time; a clocking control unit (113) that controls the clocking unit; a storage unit (115) that stores the time measured by the clocking unit; a zero-crossing detection unit (112) that detects a zero-crossing of the back electromotive force generated in the coils of the two phases; and a control signal generation unit (116) that generates the control signal, based on a result of detection made by the zero-crossing detection unit and a result of measurement made by the clocking unit. The clocking control unit causes the clocking unit to start measuring time when the one-phase excitation is started, causes the clocking unit to stop measuring time, according to a result of detecting a zero-crossing of the back electromotive force by the zero-crossing detection unit during the one-phase excitation, and causes the time measured by the clocking unit to be stored in the storage unit. The control signal generation unit generates the control signal (Sc) so as to switch the excitation state of the two-phase stepping motor from the one-phase excitation to the two-phase excitation, according to the result of detecting a zero-crossing of the back electromotive force by the zero-crossing detection unit, during the one-phase excitation. Further, the clocking control unit sets the target energization time (tg) in the clocking unit, based on the time measured by the clocking unit and stored in the storage unit, when the two-phase excitation is started, and causes the clocking unit to start measuring time until the target energization time. The control signal generation unit may generate the control signal so as to switch the excitation state of the two-phase stepping motor from the two-phase excitation to the one-phase excitation when the time measured by the clocking unit reaches the target energization time during the two-phase excitation.

[7] A motor unit (1) according to a representative embodiment of the present disclosure includes the motor drive control device (10) according to any one of [1] to [6], and the two-phase stepping motor (20).

[8] A motor drive control method according to a representative embodiment of the present disclosure is a method of controlling driving of the two-phase stepping motor (20) by the motor drive control device (10). This method includes: a first step of causing the motor drive control device to generate a control signal for controlling driving of the two-phase stepping motor so as to alternately repeat one-phase excitation in which the coil of one phase in the coils of two phases of the two-phase stepping motor is excited and two-phase excitation in which the coils of two phases in the coils of the two phases are excited; and a second step of causing the motor drive control device to drive the coils of the two phases, based on the control signal (S1, S6). The first step includes a third step (S2 to S5) of determining, based on the back electromotive force generated in the coil that was not excited during the one-phase excitation, a period of performing the one-phase excitation, and a fourth step (S7, S8) of determining, based on the period of the one-phase excitation performed before the two-phase excitation, a period of performing the two-phase excitation.

2. Specific Examples of Embodiments

Hereinafter, specific examples of embodiments of the present disclosure will be described with reference to the drawings. In the following description, components in common in the respective embodiments are labeled with the same reference numerals, and repeated description is omitted.

FIG. 1 is a block diagram showing the configuration of a motor unit according to an embodiment of the present disclosure.

As shown in FIG. 1, a motor unit 1 includes a two-phase stepping motor 20, and a motor drive control device 10 that drives the two-phase stepping motor 20. The motor unit 1 is applicable to various devices that use a motor as a power source, for example, to a device for transporting paper in a printing machine.

Figure 2:
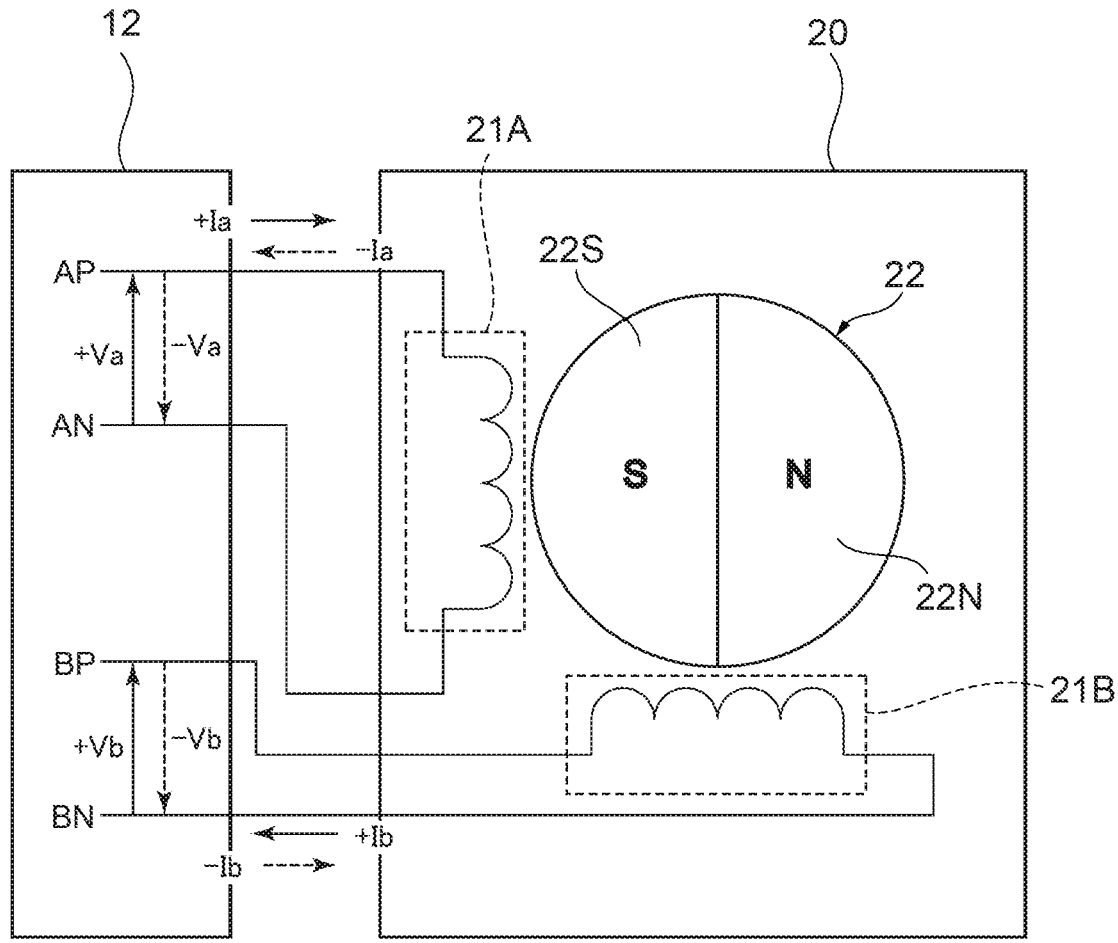
FIG. 2 is a view schematically showing the configuration of a motor according to an embodiment of the present disclosure.

FIG. 2 is a view schematically showing the configuration of the two-phase stepping motor 20.

The two-phase stepping motor 20 is a stepping motor having coils of two phases.

As shown in FIG. 2, the two-phase stepping motor 20 includes a coil 21A of the A phase, a coil 21B of the B phase, a rotor 22, and a two-phase stator yoke (not shown).

The coils 21A, 21B are coils that excite the stator yoke. Each of the coils 21A, 21B is connected to a later-described driver 12. Currents (coil currents) of different phases are caused to flow through the coils 21A, 21B, respectively.

In the present embodiment, the coils 21A, 21B may be simply referred to as the "coils 21" unless otherwise distinguished from each other.

The rotor 22 has a permanent magnet that is multi-pole magnetized so that an S pole 22S and an N pole 22N are alternately reversed along a circumferential direction. In FIG. 2, the rotor 22 having two poles is shown as an example. The stator yoke is disposed around the rotor 22 in close proximity to an outer circumferential portion of the rotor 22. By periodically switching the phases of the coil currents flowing through the respective coils 21A, 21B, the rotor 22 rotates. An output shaft (not shown) is connected to the rotor 22, and the output shaft is driven by the rotational force of the rotor 22.

The motor drive control device 10 is a device for driving the two-phase stepping motor 20. The motor drive control device 10 controls rotation and stopping of the two-phase stepping motor 20 by controlling the energization state of the coils 21A, 21B of the respective phases of the two-phase stepping motor 20, based, for example, on a drive command from a host device (not shown).

As shown in FIG. 1, the motor drive control device 10 has a controller 11 and the driver 12.

The driver 12 is a functional unit that drives the two-phase stepping motor 20 by energizing the coils 21A, 21B of the two-phase stepping motor 20. The driver 12 has a motor driver 121.

The motor driver 121 supplies drive power to the two-phase stepping motor 20, based on a control signal Sc generated by the controller 11. As shown in FIG. 2, the motor driver 121 is connected to each of a terminal AP on the positive electrode side of the coil 21A, a terminal AN on the negative electrode side of the coil 21A, a terminal BP on the positive electrode side of the coil 21B, and a terminal BN on the negative electrode side of the coil 21B, and energizes the coils 21A, 21B by applying a voltage to the respective terminals AP, AN, BP, BN.

The motor driver 121 is configured by, for example, an H-bridge circuit composed of four switching devices (for example, transistors). The motor driver 121 switches the energization of the coils 21A, 21B, for example, by selectively turning on or off the switching devices constituting the H-bridge circuit.

As shown in FIG. 2, when a current +Ia is caused to flow through the coil 21A of the A phase, the motor driver 121 applies, for example, a voltage "+Va" to the terminal AP with respect to the terminal AN of the coil 21A. On the other hand, when a current −Ia is caused to flow through the coil 21A of the A phase, the motor driver 121 applies a voltage "−Va" to the terminal AP with respect to the terminal AN of the coil 21A. Similarly, when a current +Ib is caused to flow through the coil 21B of the B phase, the motor driver 121 applies, for example, a voltage "+Vb" to the terminal BP with respect to the terminal BN of the coil 21B, and, when a current −Ib is caused to flow through the coil 21B of the B phase, the motor driver 121 applies a voltage "−Vb" to the terminal BP with respect to the terminal BN of the coil 21B.

As described above, the motor driver 121 switches the energization state of each of the coils 21A, 21B by switching the voltage to be applied across the terminals of each of the coils 21A, 21B, based on the control signal Sc from the controller 11.

The controller 11 generates the control signal Sc for controlling the driving of the two-phase stepping motor 20, and controls the driving of the two-phase stepping motor 20 through the driver 12.

The controller 11 is, for example, a program processing device (for example, a microcontroller) having a configuration in which a processor such as a CPU, various storage devices such as RAM and ROM, a timer (counter), and peripheral circuits such as an A/D converter circuit, a D/A converter circuit and an input/output interface circuit are connected to each other via a bus. In the present embodiment, although the controller 11 is packaged as an IC (integrated circuit), the controller 11 is not limited to this.

The controller 11 generates the control signal Sc for controlling the driving of the two-phase stepping motor 20 so as to alternately repeat one-phase excitation in which the coil 21 of one phase in the coils 21A, 21B of two phases of the two-phase stepping motor 20 is excited and two-phase excitation in which the coils of two phases are excited. That is, the controller 11 performs control of energization switching for the coils 21A, 21B of the two-phase stepping motor 20 by a 1-2 phase excitation method.

Figure 3:
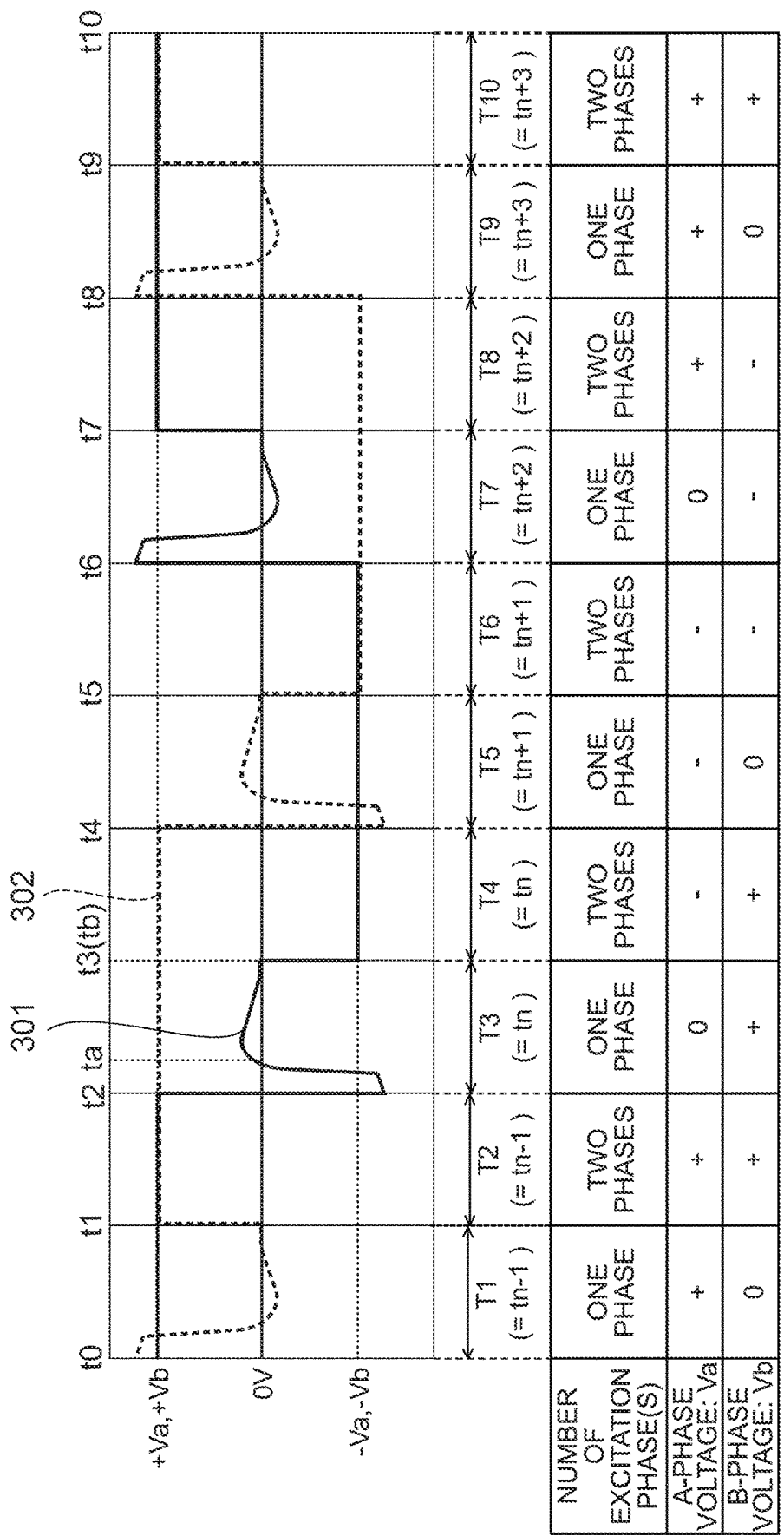
FIG. 3 is a view for explaining control of energization switching of a two-phase stepping motor by a motor drive control device according to an embodiment of the present disclosure.

FIG. 3 is a view for explaining the control of energization switching of the two-phase stepping motor by the motor drive control device according to the embodiment of the present disclosure.

In FIG. 3, reference numeral 301 denotes a voltage of the terminal AP with respect to the terminal AN of the coil 21A of the A phase (hereinafter, also referred to as the "A-phase voltage"), and reference numeral 302 represents a voltage of the terminal BP with respect to the terminal BN of the coil 21B of the B phase (hereinafter, also referred to as the "B-phase voltage").

As shown in FIG. 3, the controller 11 switches the energization state of the two-phase stepping motor 20 so as to alternately repeat the one-phase excitation and the two-phase excitation. For example, in a period T1 of one-phase excitation in FIG. 3, the A-phase voltage is "+Va" and the coil 21A is excited positively (+), and the B-phase voltage is "0" and the coil 21B is not excited. In a period T2 of two-phase excitation following the period T1, continuously the A-phase voltage is "+Va" and the coil 21A is excited positively (+), and the B-phase voltage is "+Vb" and the coil 21B is excited positively (+). In a period T3 of one-phase excitation following the period T2, the A-phase voltage is "0" and the coil 21A is not excited, and the B-phase voltage is "+Vb" and the coil 21B is excited positively (+). In a period T4 of two-phase excitation following the period T3, the A-phase voltage is "−Va" and the coil 21A is excited negatively (−), and the B-phase voltage is "+Vb" and the coil 21B is excited positively (+).

Thus, the controller 11 generates the control signal Sc and supplies the control signal Sc to the driver 12 so as to alternately switch the one-phase excitation and the two-phase excitation.

In the motor unit 1 according to the present embodiment, the period during which the one-phase excitation of two-phase stepping motor 20 is performed and the period during which the two-phase excitation of two-phase stepping motor 20 is performed are determined based on a back electromotive force generated in the coils 21A, 21B. That is, in the motor unit 1, the period of the one-phase excitation and the period of the two-phase excitation of the two-phase stepping motor 20 are not fixed periods, but are variable periods.

First, the period of the one-phase excitation of the two-phase stepping motor 20 is determined as follows.

The period of the one-phase excitation of the two-phase stepping motor 20 is determined based on the back electromotive force generated in another coil 21 that is not excited while one coil 21 is excited.

Specifically, the controller 11 generates the control signal Sc so as to switch the excitation state of the two-phase stepping motor 20 from the one-phase excitation to the two-phase excitation, according to a result of detection of a zero-crossing of the back electromotive force generated in the coil 21 that is not excited during the period of the one-phase excitation.

For example, as shown in FIG. 3, in the period T3 of the one-phase excitation, the back electromotive force of the coil 21A of the A phase, that is not excited, becomes 0 V at time ta, and thereafter becomes 0 V again at time tb. That is, the zero-crossing of the back electromotive force occurs twice in the period T3 of the one-phase excitation. Therefore, the controller 11 generates the control signal Sc so as to switch from the one-phase excitation to the two-phase excitation when the zero-crossing of the back electromotive force generated in the coil 21A that was not excited was detected twice in the period T3 of the one-phase excitation.

Thereafter, the period of the two-phase excitation of the two-phase stepping motor 20 is determined as follows.

As described above, in the period in which the one-phase excitation of the two-phase stepping motor 20 is performed, the back electromotive force is generated in the coil 21 that is not excited. On the other hand, in the period in which the two-phase excitation of the two-phase stepping motor 20 is performed (such as, for example, periods T2, T4 in FIG. 3), both the coil 21A of the A phase and the coil 21B of the B phase are excited, and therefore the back electromotive force cannot be measured on either of the coils 21A, 21B. Therefore, the timing of switching from the two-phase excitation to the one-phase excitation cannot be determined based on the back electromotive force of the coil 21 in the same manner as for the switching from the one-phase excitation to the two-phase excitation.

Hence, in the present embodiment, the period of the two-phase excitation is determined based on the period of the one-phase excitation performed before the two-phase excitation.

Specifically, the controller 11 generates the control signal Sc so as to switch the excitation state of the two-phase stepping motor 20 from the two-phase excitation to the one-phase excitation when a target energization time tg determined according to the period of the one-phase excitation performed before the two-phase excitation has elapsed after the start of the two-phase excitation.

For example, as shown in FIG. 3, in the period T4 of the two-phase excitation, since both the coil 21A of the A phase and the coil 21B of the B phase are excited, the back electromotive force cannot be measured. Therefore, the controller 11 generates the control signal Sc so as to switch from the two-phase excitation to the one-phase excitation at the timing (time t4) of elapse of the target energization time tg after the start of the two-phase excitation.

Here, the target energization time tg, that is, the period of the two-phase excitation can be determined by, for example, a method described below.

As the first method, for example, the target energization time tg is determined based on the period of the one-phase excitation performed immediately before the two-phase excitation. That is, the controller 11 sets the target energization time tg such that the period of the two-phase excitation is equal to the period of the one-phase excitation performed immediately before the two-phase excitation. For example, in FIG. 3, the period T4 of the two-phase excitation (target energization time tg) is set to the same length as the period T3 of the one-phase excitation performed immediately before the period T4.

As the second method, for example, the target energization time tg is determined based on a plurality of periods of the one-phase excitation performed before the two-phase excitation. For example, the controller 11 sets the target energization time tg using a value calculated from a plurality of periods of the one-phase excitation performed before the two-phase excitation. More specifically, the controller 11 sets the target energization time tg for the period of the two-phase excitation, based on the average value of a plurality of periods of the one-phase excitation performed before the two-phase excitation. For example, in FIG. 3, the length of the period T4 in which the two-phase excitation is performed is set at the average value of the periods T1, T3 of the one-phase excitation performed before the period T4. It may also be possible to calculate the average value by weighting a plurality of periods of the one-phase excitation performed before the two-phase excitation, and to set the target energization time tg based on the average value. For example, the average value may be calculated by weighting the respective periods of the one-phase excitation such that the period closer in time to the two-phase excitation as a reference has a higher weight.

In the following description, an example will be described on the assumption that the controller 11 determines the target energization time tg by the first method.

Figure 4:
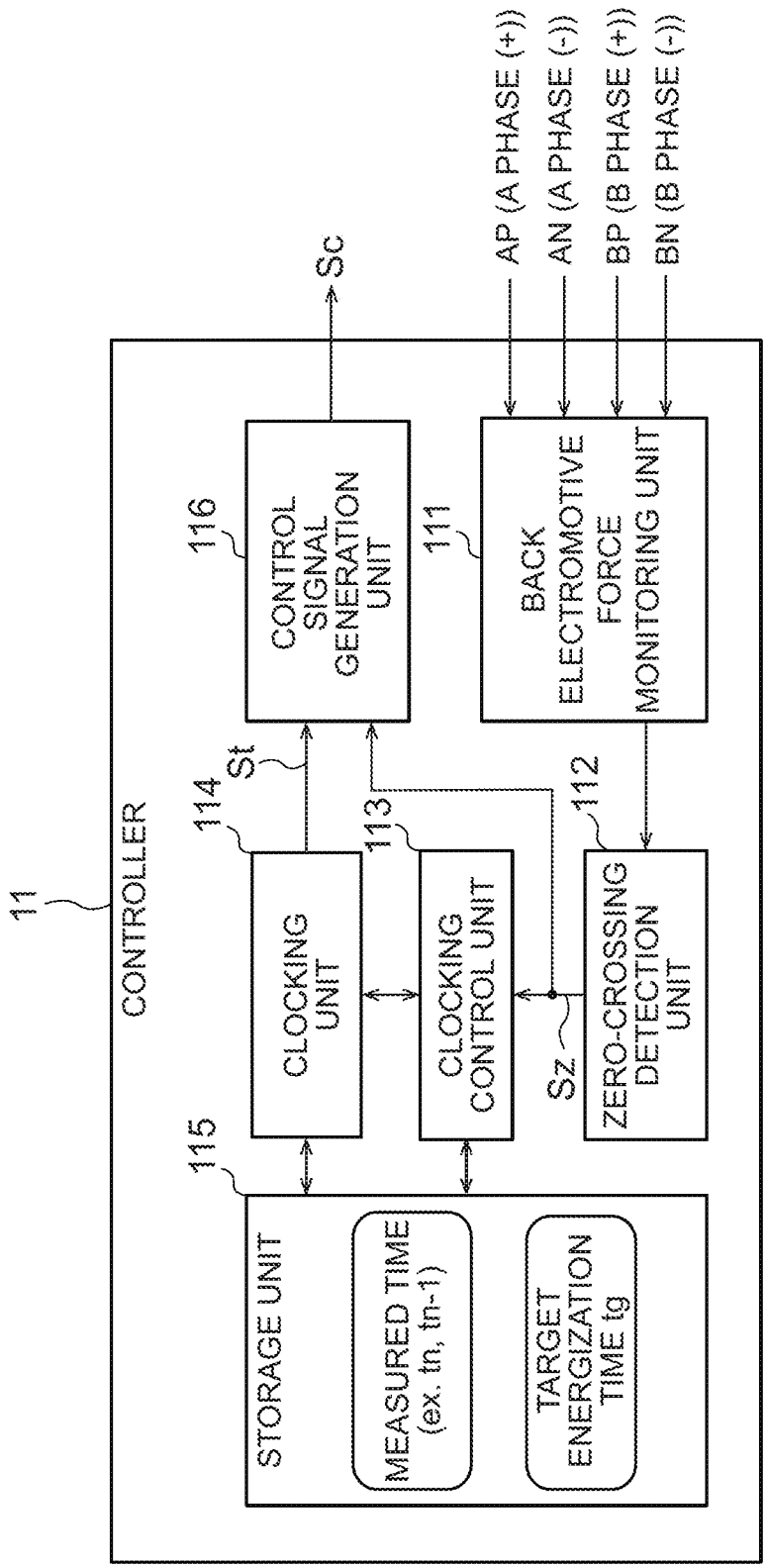
FIG. 4 is a functional block diagram of a controller in the motor drive control device according to an embodiment of the present disclosure.

FIG. 4 is a functional block diagram of the controller 11 in the motor drive control device according to an embodiment of the present disclosure.

As shown in FIG. 4, the controller 11 has a back electromotive force monitoring unit 111, a zero-crossing detection unit 112, a clocking control unit 113, a clocking unit 114, a storage unit 115, and a control signal generation unit 116 as functional units for realizing control of energization switching of the coils 21A, 21B.

For example, these functional units are realized by causing the processor in the above-described program processing device (microcontroller) to execute various calculations according to a program stored in a storage device, and to control peripheral circuits such as an A/D converter circuit and a timer.

The back electromotive force monitoring unit 111 is a functional unit that monitors the back electromotive force generated in the coils 21A, 21B of the respective phases.

The zero-crossing detection unit 112 is a functional unit for detecting a zero-crossing of the back electromotive force generated in the coils 21A, 21B of the two-phase stepping motor 20, based on the result of monitoring made by the back electromotive force monitoring unit 111. When a zero-crossing of the back electromotive force of the coil 21 that is not excited is detected, the zero-crossing detection unit 112 outputs a detection signal Sz indicating the detection of the zero-crossing.

The clocking control unit 113 is a functional unit that controls the clocking unit 114. The clocking control unit 113 can be realized, for example, by program processing performed by the processor constituting the microcontroller.

The clocking control unit 113 controls the start and stop of a time measurement performed by the clocking unit 114. By setting the target energization time tg in the clocking unit 114, the clocking control unit 113 causes the clocking unit 114 to measure time until the target energization time tg. When the measured time reaches the target energization time tg, the clocking unit 114 outputs a notification signal St indicating the elapse of the target energization time, and resets the measured time (the result of the time measurement).

The storage unit 115 is a functional unit that stores the result of the time measurement performed by the clocking unit 114.

When the one-phase excitation of the two-phase stepping motor 20 is started, the clocking control unit 113 causes the clocking unit 114 to start measuring time. When a determination is made, based on the detection signal Sz of the zero-crossing detection unit 112, that the zero-crossing of the back electromotive force was detected twice during the one-phase excitation of the two-phase stepping motor 20, the clocking control unit 113 stops the time measurement by the clocking unit 114, and stores the time measured by the clocking unit 114 (the measured time) in the storage unit 115. That is, the energization time of the one-phase excitation of the two-phase stepping motor 20 is stored in the storage unit 115.

Here, in the storage unit 115, information about a plurality of periods of the one-phase excitation measured by the clocking unit 114 may be stored, or only information about the period of the latest one-phase excitation may be stored. In the present embodiment, since the energization time of the two-phase excitation is determined by the first method, only information about the energization time of the latest one-phase excitation is stored in the storage unit 115.

The clocking control unit 113 causes the clocking unit 114 to start measuring time when the two-phase excitation of the two-phase stepping motor 20 is started. At this time, the clocking control unit 113 sets the target energization time tg in the clocking unit 114. Specifically, when the two-phase excitation of the two-phase stepping motor 20 is started, the clocking control unit 113 determines the target energization time tg, based on the result of the time measurement stored in the storage unit 115, and sets the determined target energization time tg in the clocking unit 114. For example, the clocking control unit 113 sets the time during which the latest one-phase excitation was performed, which is stored in the storage unit 115, as the target energization time tg in the clocking unit 114, and causes the clocking unit 114 to start measuring time. When the measured time reaches the target energization time tg, the clocking unit 114 outputs the notification signal St indicating the elapse of the target energization time tg.

The control signal generation unit 116 is a functional unit that generates the control signal Sc, based on the result of detection (detection signal Sz) made by the zero-crossing detection unit 112 and the result of the time measurement (notification signal St) made by the clocking unit 114. The control signal generation unit 116 can be realized, for example, by program processing performed by the processor constituting the microcontroller and peripheral circuits such as the input/output interface circuit.

The control signal generation unit 116 generates the control signal Sc so as to switch the excitation state of the two-phase stepping motor 20 from the one-phase excitation to the two-phase excitation, according to the result of detecting the zero-crossing of the back electromotive force by the zero-crossing detection unit 112 during the one-phase excitation. For example, when a determination is made, based on the detection signal Sz of the zero-crossing detection unit 112, that the zero-crossing of the back electromotive force was detected twice during the one-phase excitation, the control signal generation unit 116 generates the control signal Sc so as to switch the excitation state of the two-phase stepping motor 20 from the one-phase excitation to the two-phase excitation.

The control signal generation unit 116 also generates the control signal Sc so as to switch the excitation state of the two-phase stepping motor 20 from the two-phase excitation to the one-phase excitation when the time measured by the clocking unit 114 reaches the target energization time tg during the two-phase excitation. For example, the control signal generation unit 116 generates the control signal Sc so as to switch the excitation state of the two-phase stepping motor 20 from the two-phase excitation to the one-phase excitation when the notification signal St is output from the clocking unit 114.

Figure 5:
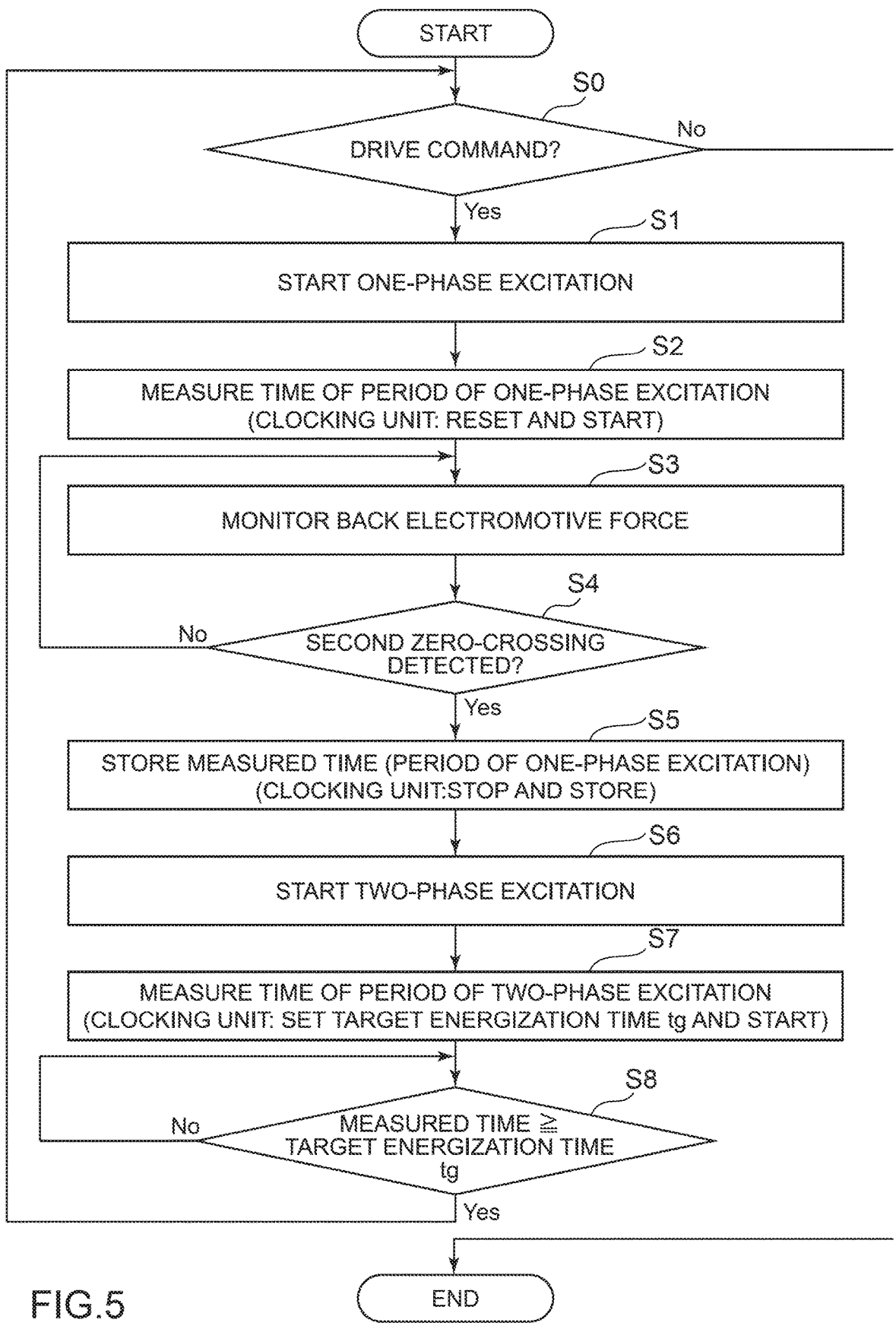
FIG. 5 is a flowchart showing the flow of control of energization switching of the two-phase stepping motor by the motor drive control device.

FIG. 5 is a flowchart showing the flow of control of energization switching of the two-phase stepping motor 20 by the motor drive control device 10.

For example, after turning on the power, the motor drive control device 10 determines whether a drive command for the two-phase stepping motor 20 has been input from an external host device (step S0). In step S0, if the drive command has not been input (if No), driving of the two-phase stepping motor 20 is not started.

On the other hand, in step S0, if the drive command has been input (if Yes), the motor drive control device 10 drives the two-phase stepping motor 20. First, the motor drive control device 10 starts the one-phase excitation of the two-phase stepping motor 20 (step S1). For example, at time t0 in FIG. 3, the control signal generation unit 116 generates the control signal Sc and supplies the control signal Sc to the driver 12 so that the A-phase voltage "+Va" is applied to the coil 21A of the A phase of the two-phase stepping motor 20, and the B-phase voltage is "0" and not applied to the coil 21B of the B phase.

The controller 11 starts measuring time of the period in which the one-phase excitation is performed (step S2). Specifically, for example, at time t0 in FIG. 3, the clocking control unit 113 controls the clocking unit 114 to start measuring time of the period T1 in which the one-phase excitation is performed.

Thereafter, the controller 11 monitors the back electromotive force of the coil 21B of the two-phase stepping motor 20 (step S3). Specifically, the zero-crossing detection unit 112 monitors, based on the result of monitoring made by the back electromotive force monitoring unit 111, whether a zero-crossing of the back electromotive force of the coil 21B has occurred.

Thereafter, the controller 11 determines whether the second zero-crossing of the back electromotive force of the coil 21B was detected (step S4).

In step S4, if the zero-crossing of the back electromotive force was not detected twice (if No), the controller 11 continues to monitor occurrence of a zero-crossing of the back electromotive force.

In step S4, if the second zero-crossing of the back electromotive force has been detected (if Yes), the controller 11 stops measuring the time of the period in which the one-phase excitation is performed, and stores the result of the time measurement (step S5). For example, at time t1 in FIG. 3, when the second zero-crossing of the back electromotive force of the coil 21 was detected by the zero-crossing detection unit 112, the clocking control unit 113 stops measurement of the time of the period T1 of the one-phase excitation by the clocking unit 114, and stores the result of measurement (the time tn−1 of the period T1 of the one-phase excitation) in the storage unit 115.

Thereafter, the controller 11 switches the excitation state of the two-phase stepping motor 20 from the one-phase excitation to the two-phase excitation (step S6). For example, at time t1 in FIG. 3, the control signal generation unit 116 generates the control signal Sc and supplies the control signal Sc to the driver 12 so as to apply the A-phase voltage "+Va" to the coil 21A of the A phase and apply the B-phase voltage "+Vb" to the coil 21B of the B phase.

Thereafter, the controller 11 sets the target energization time tg, and starts measuring time of the period of the two-phase excitation (step S7). For example, the clocking control unit 113 resets the time measured by the clocking unit 114, sets the measured time stored in the storage unit 115, that is, the time (tn−1) of the period T1 of the immediately preceding one-phase excitation, as the target energization time tg in the clocking unit 114, and causes the clocking unit 114 to start measuring time until the target energization time tg.

Thereafter, the controller 11 determines whether the target energization time tg has elapsed after the start of the two-phase excitation (step S8). Specifically, the control signal generation unit 116 determines whether the notification signal St, which indicates that the measured time has reached the target energization time tg, has been output from the clocking unit 114.

In step S8, if the target energization time tg has not elapsed (if No), the controller 11 continues the two-phase excitation of the two-phase stepping motor 20.

On the other hand, in step S8, if the target energization time tg has elapsed after the start of the two-phase excitation (if Yes), the controller 11 returns to step S1 and switches the two-phase stepping motor 20 from the two-phase excitation to the one-phase excitation. For example, when the notification signal St is output from the clocking unit 114 at time t2 in FIG. 3, the control signal generation unit 116 generates the control signal Sc and supplies the control signal Sc to the driver 12 so that the A-phase voltage of the A phase coil 21A of the two-phase stepping motor 20 is "0" and not applied, and the B-phase voltage "+Vb" is applied to the coil 21B of the B phase.

Thereafter, the motor drive control device 10 repeatedly executes the above-described processing until a stop command for the two-phase stepping motor 20 is input from the above-mentioned device.

According to the control of energization switching, as shown in FIG. 3, the period T1 of the one-phase excitation and the period T2 of the subsequent two-phase excitation are equal periods (tn−1), the period T3 of the one-phase excitation and the period T4 of the subsequent two-phase excitation are equal periods (tn), and the period T5 of the one-phase excitation and the period T6 of the subsequent two-phase excitation are equal periods (tn+1). That is, the controller 11 updates, based on the back electromotive force generated in the coils 21, the excitation period of the two-phase stepping motor 20 in each cycle of a set of one-phase excitation and two-phase excitation.

As described above, when controlling the energization of the two-phase stepping motor 20 by the 1-2 phase excitation method, the motor drive control device 10 according to the present embodiment determines, based on the back electromotive force generated in the coil 21 that is not excited during the one-phase excitation, a period of performing the one-phase excitation, and determines, based on the period of the one-phase excitation performed before the two-phase excitation, a period of performing the two-phase excitation.

In general, in a stepping motor, when the magnitude of load on the stepping motor has changed, the back electromotive force which is generated in the coil also changes. For example, in the 1-2 phase excitation method, when the load on the stepping motor increases, the time required for the back electromotive force to converge to 0 V tends to be longer.

Therefore, like the motor drive control device 10 according to the present embodiment, by determining, based on the back electromotive force generated in the coil 21 during the one-phase excitation, a period of performing the one-phase excitation, and determining, based on the period of the one-phase excitation performed before the two-phase excitation, a period of performing the two-phase excitation, it is possible to adjust (vary) the period of the one-phase excitation and the period of the two-phase excitation, according to the magnitude of the load on the two-phase stepping motor 20.

Consequently, compared with conventional energization control using the 1-2 phase excitation method in which the period of the one-phase excitation and the period of the two-phase excitation are fixed, the tolerance of the two-phase stepping motor to load changes can be increased, and step-out is less likely to occur.

Moreover, in the motor drive control device 10 according to the present embodiment, the controller 11 generates the control signal Sc so as to switch the excitation state of the two-phase stepping motor 20 from the one-phase excitation to the two-phase excitation, according to the result of detection of a zero-crossing of the back electromotive force generated in the coil 21 that is not excited during the period of the one-phase excitation.

Hence, it is possible to adjust the energization time of the one-phase excitation to an appropriate length, according to the length of the period during which the back electromotive force is generated.

Further, the controller 11 generates the control signal Sc so as to switch the excitation state of the two-phase stepping motor 20 from the two-phase excitation to the one-phase excitation when the target energization time tg determined according to the period of the one-phase excitation performed before two-phase excitation has elapsed after the start of the two-phase excitation.

Thus, the period of the two-phase excitation is determined based on the period of the one-phase excitation appropriately adjusted according to the load on the two-phase stepping motor 20. That is, similarly to the energization time of the one-phase excitation, it is also possible to adjust the energization time of the two-phase excitation in which the back electromotive force cannot be detected to an appropriate length according to the load.

In the motor drive control device 10, the controller 11 sets the target energization time tg such that the period of the two-phase excitation is equal to the period of the one-phase excitation performed immediately before the two-phase excitation.

Consequently, since the period of the two-phase excitation can be more quickly adjusted to follow a change in the load on the two-phase stepping motor 20, it is possible to further increase the tolerance of the two-phase stepping motor 20 to load changes. Furthermore, since this makes it possible to reduce the amount of calculation by a processor (CPU) which is necessary for determining the target energization time tg (the period of the two-phase excitation), it is possible to reduce an increase in the consumption of power by the processor.

In the motor drive control device 10, the controller 11 may set the target energization time tg for the period of the two-phase excitation, based on the average value of a plurality of periods of the one-phase excitation performed before the two-phase excitation.

This makes it possible to cause the period of the one-phase excitation to quickly follow a change in the load on the two-phase stepping motor 20, and cause the period of the two-phase excitation to gradually follow a change in the load on the two-phase stepping motor 20.

Further, in the motor drive control device 10, the controller 11 generates the control signal Sc so as to switch the excitation state of the two-phase stepping motor 20 from the one-phase excitation to the two-phase excitation when the zero-crossing of the back electromotive force generated in the coil 21 that was not excited was detected twice during the period of the one-phase excitation.

In general, in a two-phase stepping motor in which energization is controlled by the 1-2 phase excitation method, the clocking of a zero-crossing of the back electromotive force generated in the coil during the period of the one-phase excitation tends to be delayed as the load on the stepping motor increases.

Therefore, like the motor drive control device 10 according to the present embodiment, by determining the clocking of switching the excitation state of the two-phase stepping motor 20 from the one-phase excitation to the two-phase excitation when the zero-crossing of the back electromotive force generated in the coil 21 that was not excited was detected twice during the period of the one-phase excitation, energization switching can be performed at an appropriate clocking according to the magnitude of the load, and consequently it is possible to further increase the tolerance of the two-phase stepping motor 20 to load changes.

Expansion of Embodiments

The disclosure made by the present inventors has been specifically described based on the above embodiments, but, needless to say, the disclosure is not limited to the embodiments and can be modified in various ways without departing from the scope and spirit of the disclosure.

For example, the motor unit 1 according to the embodiment is not limited to the configuration disclosed in FIG. 1. For example, the driver 12 may have another circuit such as a current detection circuit for detecting coil currents of the coils 21A, 21B in addition to the motor driver 121.

Moreover, in the above embodiment, an example is presented for the case in which the controller 11 generates the control signal Sc so as to switch the excitation state of the two-phase stepping motor 20 from the one-phase excitation to the two-phase excitation when the zero-crossing of the back electromotive force in the coil was detected twice, but this is not a limitation. For example, the controller 11 may generate the control signal Sc so as to switch the excitation state of the two-phase stepping motor 20 from the one-phase excitation to the two-phase excitation after a certain time has elapsed since the zero-crossing of the back electromotive force of the coil was detected twice.

Further, in the above embodiment, an example is presented for the case in which the controller 11 sets the target energization time tg for the period of the two-phase excitation, based on the average value of a plurality of periods of the one-phase excitation performed before the two-phase excitation, but this is not a limitation. For example, the controller 11 may set the target energization time tg for the period of the two-phase excitation, based on the longest period among a plurality of periods of the one-phase excitation performed before the two-phase excitation.

Furthermore, the above-mentioned flowchart just illustrates an example for explaining the operation, and is not a limitation. That is, the steps shown in each of the drawings in the flowchart are specific examples, and are not limited to this flow. For example, the order of some processes may be changed, another process may be inserted between some processes, or some processes may be performed in parallel.

What is claimed is:

1. A motor drive control device comprising:
a controller that generates a control signal for controlling driving of a two-phase stepping motor so as to alternately repeat one-phase excitation in which a coil of one phase in coils of two phases of the two-phase stepping motor is excited and two-phase excitation in which the coils of two phases in the coils of the two phases are excited; and
a driver that drives the coils of the two phases, based on the control signal, wherein
the controller determines, based on a back electromotive force generated in the coil that was not excited during the one-phase excitation, a period of performing the one-phase excitation, and determines, based on the period of the one-phase excitation performed before the two-phase excitation, a period of performing the two-phase excitation.

2. The motor drive control device according to claim 1, wherein
the controller generates the control signal so as to switch an excitation state of the two-phase stepping motor from the one-phase excitation to the two-phase excitation, according to a result of detection of a zero-crossing of the back electromotive force generated in the coil that was not excited during the period of the one-phase excitation, and,
after the start of the two-phase excitation, when a target energization time determined according to the period of the one-phase excitation performed before the two-phase excitation has elapsed, the controller generates the control signal so as to switch the excitation state of the two-phase stepping motor from the two-phase excitation to the one-phase excitation.

3. The motor drive control device according to claim 2, wherein
the controller sets the target energization time such that the period of the two-phase excitation is equal to the period of the one-phase excitation performed immediately before the two-phase excitation.

4. The motor drive control device according to claim 2, wherein
the controller sets the target energization time for the period of the two-phase excitation, based on a value calculated from a plurality of periods of the one-phase excitation performed before the two-phase excitation.

5. The motor drive control device according to claim 2, wherein
the controller generates the control signal so as to switch the excitation state of the two-phase stepping motor from the one-phase excitation to the two-phase excitation when the zero-crossing of the back electromotive force generated in the coil that was not excited was detected twice during the period of the one-phase excitation.

6. The motor drive control device according to claim 2, wherein the controller includes:
a clocking unit that measures time;
a clocking control unit that controls the clocking unit;
a storage unit that stores the time measured by the clocking unit;
a zero-crossing detection unit that detects a zero-crossing of the back electromotive force generated in the coils of the two phases; and
a control signal generation unit that generates the control signal, based on a result of detection made by the zero-crossing detection unit and a result of measurement made by the clocking unit, wherein
the clocking control unit causes the clocking unit to start measuring time when the one-phase excitation is started, causes the clocking unit to stop measuring time, according to a result of detecting a zero-crossing of the back electromotive force by the zero-crossing detection unit during the one-phase excitation, and causes the time measured by the clocking unit to be stored in the storage unit,
the control signal generation unit generates the control signal so as to switch the excitation state of the two-phase stepping motor from the one-phase excitation to the two-phase excitation, according to the result of detecting a zero-crossing of the back electromotive force by the zero-crossing detection unit, during the one-phase excitation,
the clocking control unit sets, based on the time measured by the clocking unit and stored in the storage unit, the target energization time in the clocking unit when the two-phase excitation is started, and causes the clocking unit to start measuring time until the target energization time, and
the control signal generation unit generates the control signal so as to switch the excitation state of the two-phase stepping motor from the two-phase excitation to the one-phase excitation when the time measured by the clocking unit reaches the target energization time during the two-phase excitation.

7. A motor unit comprising:
the motor drive control device according to claim 1; and
the two-phase stepping motor.

8. A motor drive control method for controlling driving of a two-phase stepping motor by a motor drive control device, the method comprising:
   a first step of causing the motor drive control device to generate a control signal for controlling driving of the two-phase stepping motor so as to alternately repeat one-phase excitation in which a coil of one phase in coils of two phases of the two-phase stepping motor is excited and two-phase excitation in which the coils of two phases in the coils of the two phases are excited; and
   a second step of causing the motor drive control device to drive the coils of the two phases, based on the control signal, wherein
   the first step includes a third step of determining, based on a back electromotive force generated in the coil that was not excited during the one-phase excitation, a period of performing the one-phase excitation, and
   a fourth step of determining, based on the period of the one-phase excitation performed before the two-phase excitation, a period of performing the two-phase excitation.

\* \* \* \* \*